UNITED STATES PATENT OFFICE.

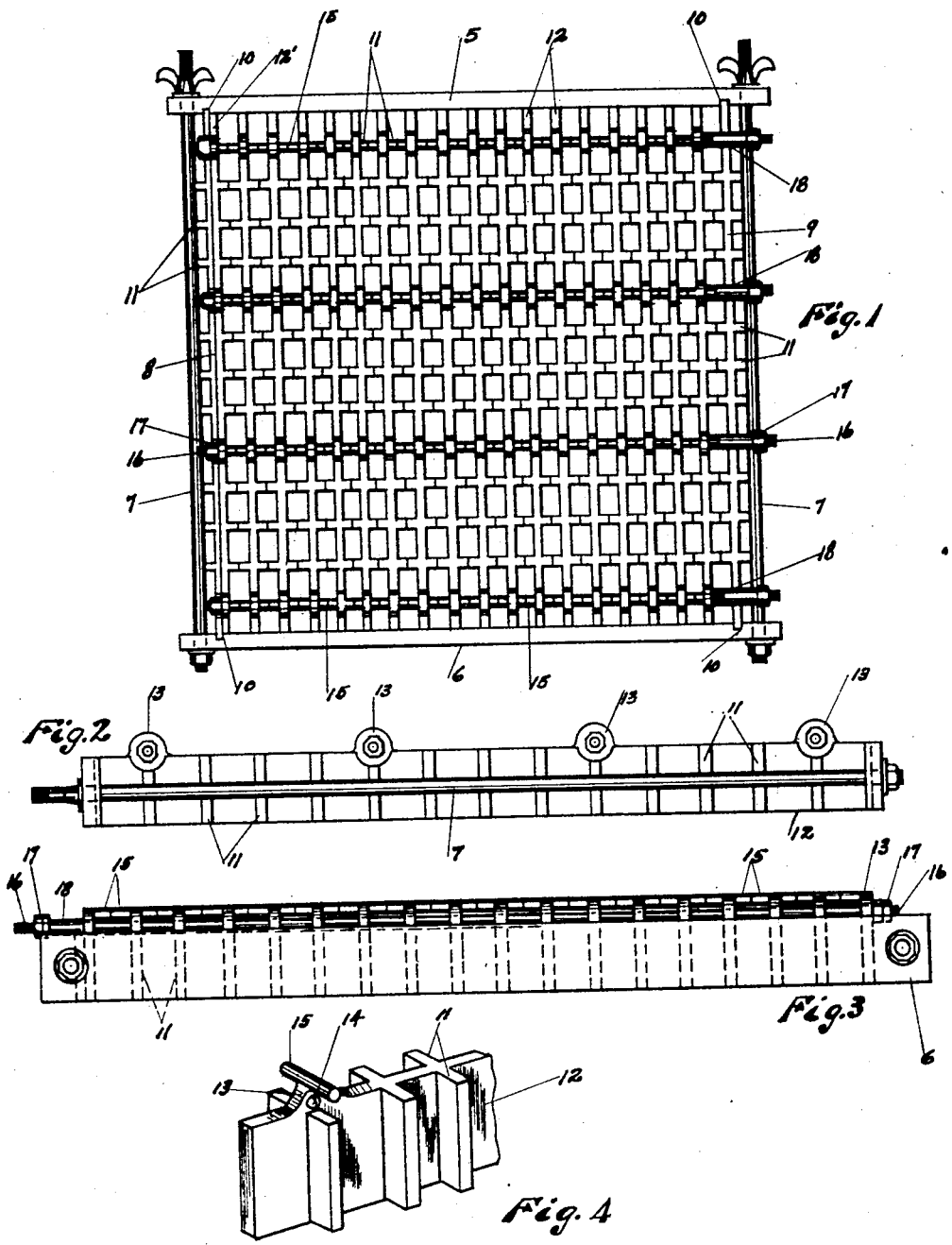

PETER WITTY, OF EVANSTON, ILLINOIS.

CANDY-MOLD.

1,387,574.　　　Specification of Letters Patent.　　Patented Aug. 16, 1921.

Application filed June 28, 1920. Serial No. 392,360.

*To all whom it may concern:*

Be it known that I, PETER WITTY, a citizen of the United States, and a resident of the city of Evanston, county of Cook, and State of Illinois, have invented certain new and useful Improvements in Candy-Molds, of which the following is a specification.

My invention relates to improvements in candy molds, and has for its object the provision of an improved construction of this character adapted for the molding of candy into rectangular blocks and which is of simple construction and efficient in operation.

Other objects will appear hereinafter.

The invention consists in the combinations and arrangements of parts hereinafter described and claimed.

The invention will be best understood by reference to the accompanying drawings forming a part of this specification, and in which, Figure 1, is a top plan view of a candy mold embodying the invention, Fig. 2, a side view of the same, Fig. 3, an end view of the same, and Fig. 4, a perspective view of a portion of one of a plurality of mold bars employed in the construction.

The preferred form of construction, as illustrated in the drawings, comprises end bars 5 and 6 connected together at their ends by means of bolts 7. Side bars 8 and 9 extend between the end bars 5 and 6 adjacent the bolts 7, said side bars being provided with lateral fins 11 contacting with the inner sides of said bolts and the ends of said side bars being set into notches 10 in end bars 5 and 6. A plurality of mold bars 12 are arranged within the frame thus produced in substantially parallel relation with each other, each of said mold bars being provided on opposite sides with oppositely arranged fins 11 registering with and coöperating with fins on the adjacent bars to form rectangular mold spaces as indicated. Each of the mold bars 12 is provided with four upstanding lugs or ears 13, provided with transverse perforations 14, the lugs 13 on the respective mold bars registering with each other. On top of each lug 13 is a transverse rod like stop 15 extending laterally the same distance as the edges of the fins 11, said stops on the different mold bars registering and contacting with each other. Bolts 16 are passed through the registering perforations 14 and tightened in place by means of nuts 17, distancing sleeves 18 being inserted between the corresponding nuts and the lugs on the corresponding mold bar so as to bring said nuts laterally beyond the bar 9 to give free access thereto to a wrench.

In use, the mold is assembled as indicated and rested upon a flat surface such as a marble slab or the like, the hot candy is poured into the various mold spaces and handle sticks may then be inserted in the hot candy if desired. When the candy is cooled the bolts are loosened whereupon the candy may be readily removed.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:—

1. A mold comprising a plurality of bars assembled together in substantially parallel relation, each bar having fins on opposite sides thereof registering and coöperating with those on adjacent bars to constitute mold spaces; means for detachably securing said bars together, and a frame surrounding said bars and detachably holding same in position, substantially as described.

2. A mold comprising a plurality of bars assembled together in substantially parallel relation, each bar having fins on opposite sides thereof corresponding with those on adjacent bars to constitute mold spaces; means for detachably securing said bars together; perforated registering lugs on said bars; bolts passing through said lugs and binding said bars together laterally; end bars contacting with the ends of said mold bars; and bolts securing said end bars together, substantially as described.

3. A mold comprising a plurality of mold bars assembled together in substantially parallel relation, each bar having fins on opposite sides thereof registering and coöperating with those on adjacent bars to constitute mold spaces; perforated registering lugs on the tops of said bars; stops on the tops of said lugs of the same lateral extension as said fins; bolts passing through said lugs and binding said bars together laterally; end bars contacting with the ends of said mold bars; and bolts securing said end bars together, substantially as described.

In testimony whereof I have signed my name to this specification in the presence of two subscribing witnesses.

PETER WITTY.

Witnesses:
 ROSE ROSEN,
 B. G. RICHARDS.